United States Patent [19]

Hashimoto et al.

[11] Patent Number: 5,327,163
[45] Date of Patent: Jul. 5, 1994

[54] DISPLAY INTEGRATED TYPE POSITION READING APPARATUS

[75] Inventors: Katsuhiko Hashimoto, Nara; Koichi Oda, Sakai, both of Japan

[73] Assignee: Sharp Kabushiki Kaisha, Osaka, Japan

[21] Appl. No.: 979,888

[22] Filed: Nov. 23, 1992

[30] Foreign Application Priority Data

Nov. 28, 1991 [JP] Japan .................. 3-314887

[51] Int. Cl.⁵ .............................................. G09G 3/02
[52] U.S. Cl. ..................... 345/173; 345/182; 178/18
[58] Field of Search ............. 340/706, 707, 708, 712, 340/710; 178/18, 19; 345/173, 179, 180, 181, 182, 183, 87; 375/99

[56] References Cited

U.S. PATENT DOCUMENTS 4,841,290  6/1989  Nakano et al. .................. 340/712
4,910,363  3/1990  Kobayashi et al. .............. 178/18
5,083,118  1/1992  Kazama .......................... 340/706

FOREIGN PATENT DOCUMENTS 0184535  6/1986  European Pat. Off. .
62-218941  9/1987  Japan .

OTHER PUBLICATIONS

IBM Technical Discosure Bulletin, vol. 34 No. 7B, Dec. 1991 "Methods to Minimize the Effects of LCD M-Signal Noise on the Operation of an Attached Sensor Screen" pp. 435-436.

Primary Examiner—Alvin E. Oberley
Assistant Examiner—Chanh Nguyen

[57] ABSTRACT

A display integrated type position reading apparatus includes a display device driven for display in accordance with a driving signal in synchronization with a predetermined clock signal, and a conductive tablet mounted on a display screen of the display device. In operation, a CPU controls a tablet controller to apply voltage to the tablet. In response to a depression of an arbitrary position on the main surface of the tablet, the CPU reads out the depressed position as a digital signal via an A/D converter. The sampling by the A/D converter relating to reading is carried out at sampling points so as to avoid the mixing of noise, caused by a signal for driving the display unit, into the digital signal, resulting in an improvement in the read out accuracy of the depressed position.

14 Claims, 8 Drawing Sheets

DISPLAY INTEGRATED TYPE POSITION READING APPARATUS

BACKGROUND OF THE INVENTION

1. Field of the Invention

The present invention relates to a display integrated type position reading apparatus, and more particularly, to improvement of position reading accuracy in reading out a specified position on a thin film and displaying it on a screen in an apparatus having a transparent thin film resistor mounted integrally on a display screen such as a liquid crystal plate.

2. Description of the Background Art

FIGS. 7 and 8 show structures of a display integrated type tablet apparatus employed in a conventional apparatus and in an embodiment of the present invention. Referring to FIG. 7, a display integrated type tablet apparatus includes a CPU (Central Processing Unit) 1 for centralized management and control of the apparatus, a ROM 2 and a RAM 3 for storing programs and data, a clock 4, an I/O (Input/Output) unit 5 including a printer and a CRT (Cathode Ray Tube) connected to the apparatus, a keyboard 6 provided for entering external data, a display controller 12 controlled by the CPU 1, an A/D converter (analog/digital converting circuit) 8, a tablet controller 9, a tablet 10 controlled by the controller 9, and a display device 11 formed of a liquid crystal plate driven by the display controller 12 for display. The liquid crystal plate includes a plurality of liquid crystal elements arranged in a matrix. Each element is driven by the controller 12 for screen display.

FIG. 8 shows the structure of the tablet 10 and the display device 11. The tablet 10 is formed of a structure where an X direction transparent film resistor 10a which is a transparent thin film resistor having an electrode provided at both ends (depicted as a thick line in the drawing) of the horizontal direction in the drawing (referred to as the X direction hereinafter) and a Y direction transparent film resistor 10b which is a thin film resistor having an electrode provided at both ends (depicted as a thick line in the drawing) of the vertical direction in the drawing (referred to as the Y direction hereinafter) are overlaid with a very small uniform gap therebetween. The display screen of the display device 11 is positioned at the side of the film resistor 10b opposite to the film resistor 10a. The X direction transparent film resistor 10a has the current flow from the $X_H$ side electrode towards the $X_L$ side electrode at the time of voltage application by the controller 9. The Y direction transparent film resistor 10b has the current flow from the $Y_H$ side electrode towards the $Y_L$ side electrode at the time of voltage application by the controller 9. It is assumed that voltage is applied to film resistors 10a and 10b by the controller 9. When a user depresses the surface of the tablet 10 with the tip of a pen or a pencil, the film resistor 10a is brought into contact with the film resistor 10b at that depressed position, whereby the depressed position is detected by a voltage signal level in accordance with the divided resistance on the film resistors 10a and 10b. The voltage signal is provided from the X direction transparent film resistor 10a and the Y direction transparent film resistor 10b to be applied to the CPU 1 as XY coordinate values via the A/D converter 8. The CPU 1 drives the display controller 12 in response to the applied coordinate values, whereby the controller 12 drives the corresponding elements on the display device 11 for display. Thus, when a user depresses a desired position on the tablet 10, the depressed position can be confirmed visually by screen display.

In the above-described display integrated type tablet apparatus where the display device 11 and the tablet 10 of transparent film resistors 10a and 10b are integrated, there was a problem of lowering the accuracy of the coordinate measurement because of noise mixed into the voltage signal entering the A/D converter 8 caused by the driving signal from the controller 12 to the display device 11. That is to say, there was a problem of generation of reading out coordinates without order. Therefore, means were provided for reducing noise in the detected signal of the display integrated type tablet apparatus as shown in FIGS. 9 and 10. Referring to FIG. 9, condensers CX and CY for noise removal were inserted in the X direction and the Y direction, respectively, at the terminals for coordinate measurement, i.e. input terminals of the A/D converter 8. Referring to FIG. 10, noise is reduced in the detected signal from the tablet 10 due to driving the display device 11 by increasing the distance $L\alpha$ between the display device 11 and the tablet 10 (the Y direction transparent film resistor 10b).

By such means, noise overlaid in the detected coordinates, i.e. the detected voltage signal, of the tablet 10 is reduced to suppress measurement error significantly.

However the above-described means for noise reduction had the following problems.

In the case where particular elements for noise reduction such as condensers CX and CY are provided as shown in FIG. 9, it was technically difficult to completely remove noise only with these noise reduction elements. There was a problem of increase in the cost of the apparatus itself due to the number of components being increased even by the additional provision of these elements.

By increasing the distance $L\alpha$ between the display device 11 and the tablet 10 as shown in FIG. 10, the distance between the main surface of the tablet 10 and the screen of the display device 11 was unnecessarily increased to result in inadequate parallax. There was also a problem that the thickness of the apparatus is increased in the case of a structure where the tablet 10 and the display device 11 are formed integrally.

The display integrated type tablet apparatus as a man-machine interface is becoming increasingly important with the need of a larger screen, higher accuracy (corresponding to the critical display drive of the display device), lower power consumption, and lower cost. Although the above described method employing transparent film resistors 10a and 10b is superior from the standpoint of low cost and low power consumption, the amount of noise is increased from the display device 11 in accordance with increase in the screen size, resulting in lowering the position reading accuracy. That is to say, because the tablet 10 and the display device 11 establish an electrostatic capacitive coupling, there is a disadvantage of increase in the amount of noise included in the position read out signal in proportion to the area size of the main surface of the tablet 10.

SUMMARY OF THE INVENTION

An object of the present invention is to provide a display integrated type position reading apparatus including a display unit and a conductive sheet member mounted on the display screen of the display unit that can avoid noise from the display unit to improve reading accuracy in reading out a position on the main surface of the sheet member.

To achieve the above object, the display integrated type position reading apparatus according to the present invention includes a display unit that is driven for display in accordance with a driving signal in synchronization with a predetermined clock signal, a conductive sheet member mounted on the display screen of the display unit, a depression detecting unit for detecting a depression of an arbitrary position on a main surface of the sheet member opposite to the display screen of the sheet member, and a position reading unit in response to a detection of the depression detecting unit for reading out as an electric signal the depressed position in accordance with the cycle in synchronization with the clock signal of the display unit.

In operation, a depressed position is read out as an electric signal in accordance with the cycle in synchronization with the clock signal for driving the display unit in response to a detection by the depression detecting unit. In particular, the read out cycle is set to avoid the mixing of a noise signal, caused by the signal for driving the display unit, into the read out electric signal, resulting in the complete elimination of a noise signal from the display unit being mixed into the read out position detecting signal. Therefore, the read out accuracy of the depressed position can easily be improved even while driving the display unit. Improvement in reading accuracy due to this noise removal can be achieved without using a noise removing element so that the cost is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The foregoing and other objects, features, aspects and advantages of the present invention will become more apparent from the following detailed description of the present invention when taken in conjunction with the accompanying drawings which are given by way of illustration only and are thus not limitative of the present invention and wherein:.

DESCRIPTION OF THE PREFERRED EMBODIMENTS

An embodiment of the present invention will be described hereinafter with reference to the drawings.

Figure 7:
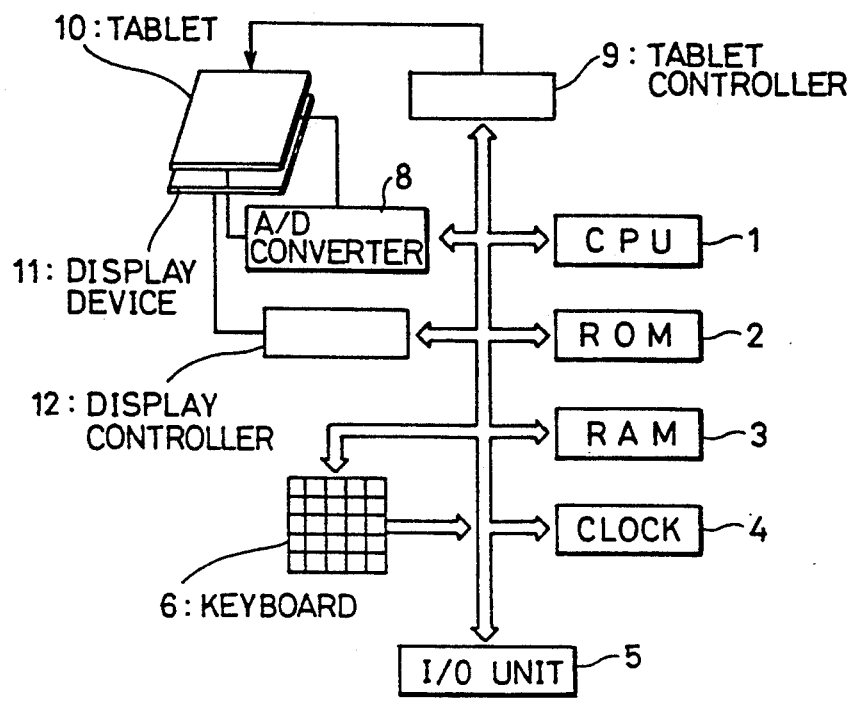
FIGS. 7 and 8 are structures of a display integrated type tablet apparatus employed in a conventional apparatus and in an embodiment of the present invention.
Figure 8:
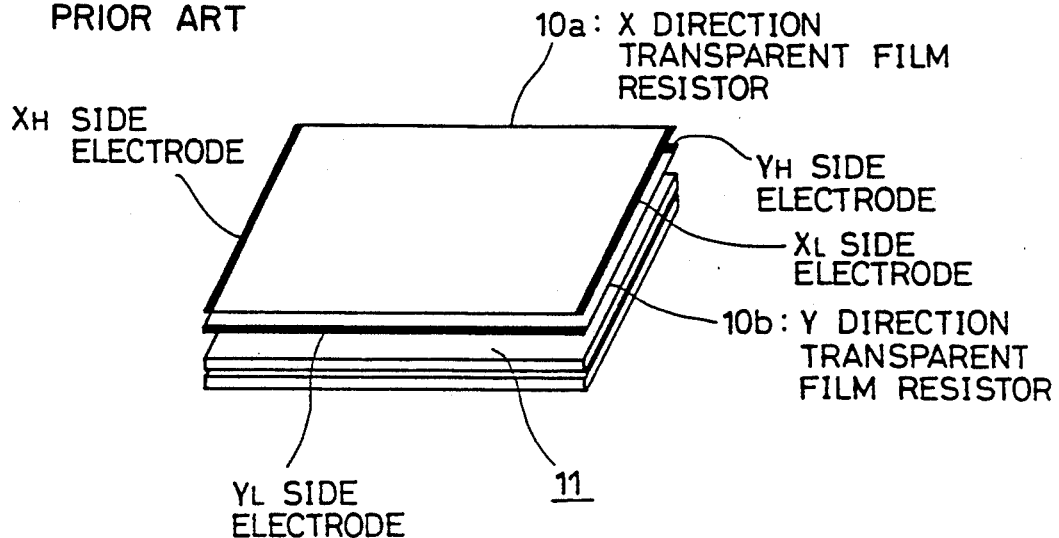
Figure 9:
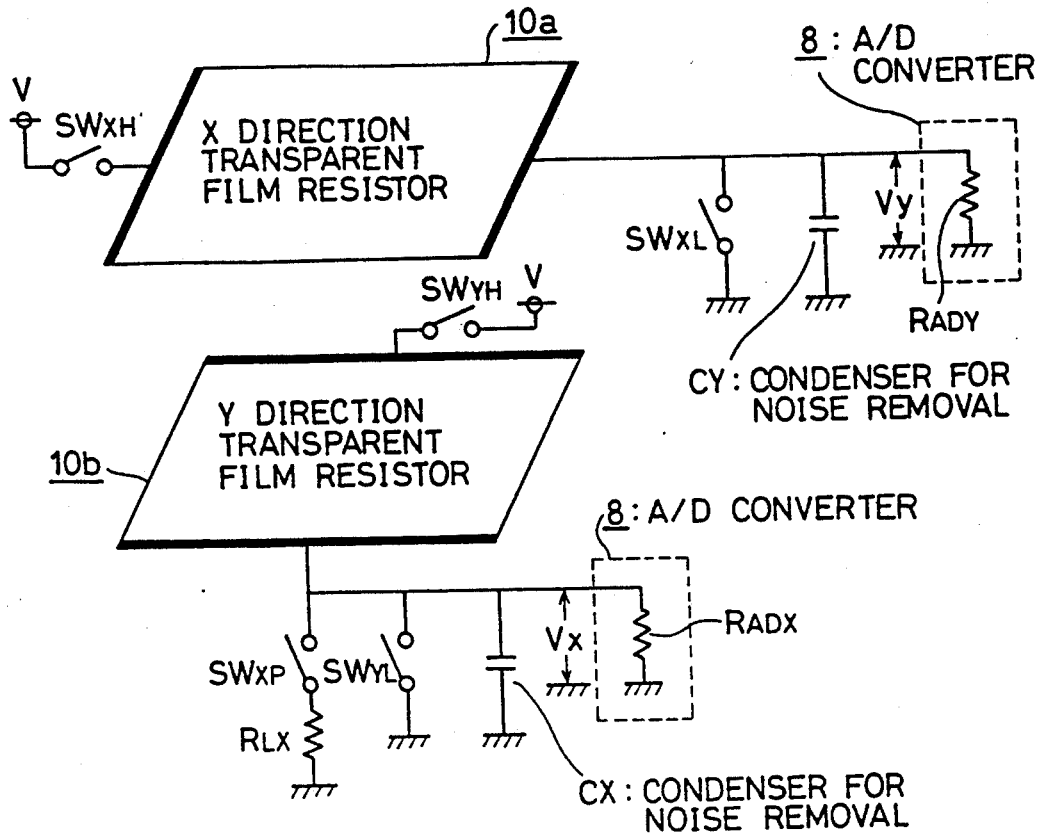
FIGS. 9 and 10 are diagrams for describing means for reducing noise included in a detected signal of a conventional display integrated type tablet apparatus.
Figure 10:
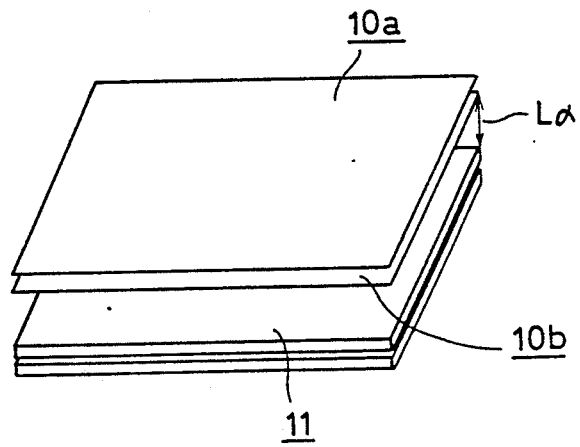

The system structure of the display integrated type tablet apparatus of the present embodiment is similar to that shown in FIGS. 7 and 8, and their description will not be repeated. However, the display controller 7 of FIG. 2 for driving the display device 11 is an improvement of the conventional display controller 12, and its details will be described afterwards.

Figure 1A:
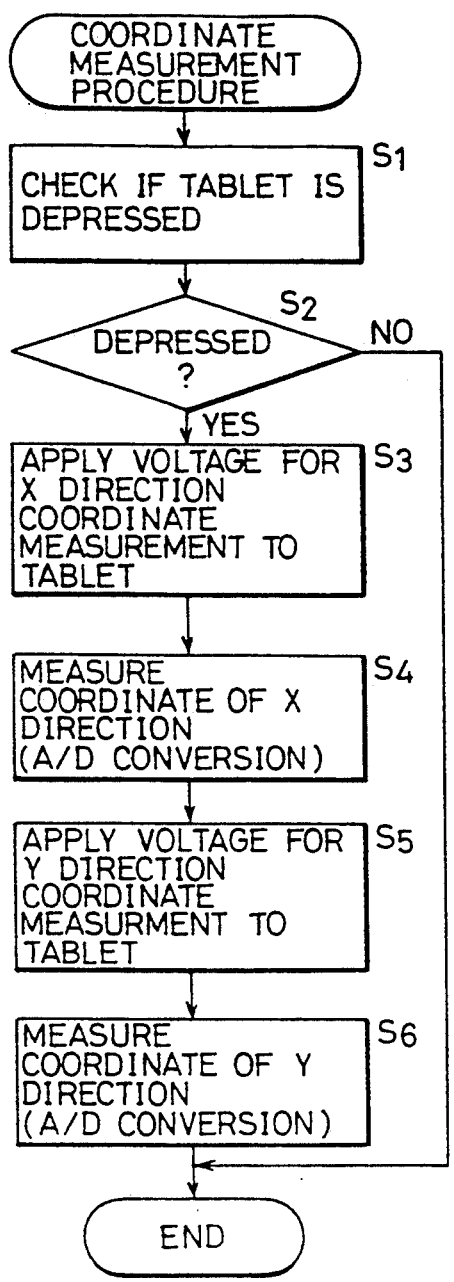
FIGS. 1A and 1B are procedure flow charts for coordinate measurement in a display integrated type tablet device according to an embodiment of the present invention.
Figure 1B:
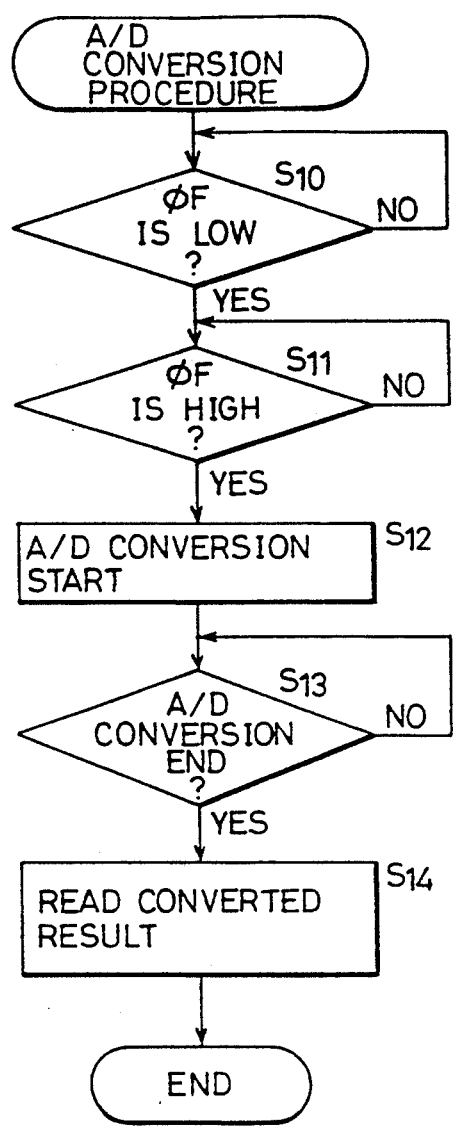

FIGS. 1A and 1B are procedure flow charts for reading out coordinates in a display integrated type tablet apparatus according to an embodiment of the present invention. These procedure flow chart are stored in the ROM 2 in advance as programs and are executed under the control of the CPU 1.

Figure 2:
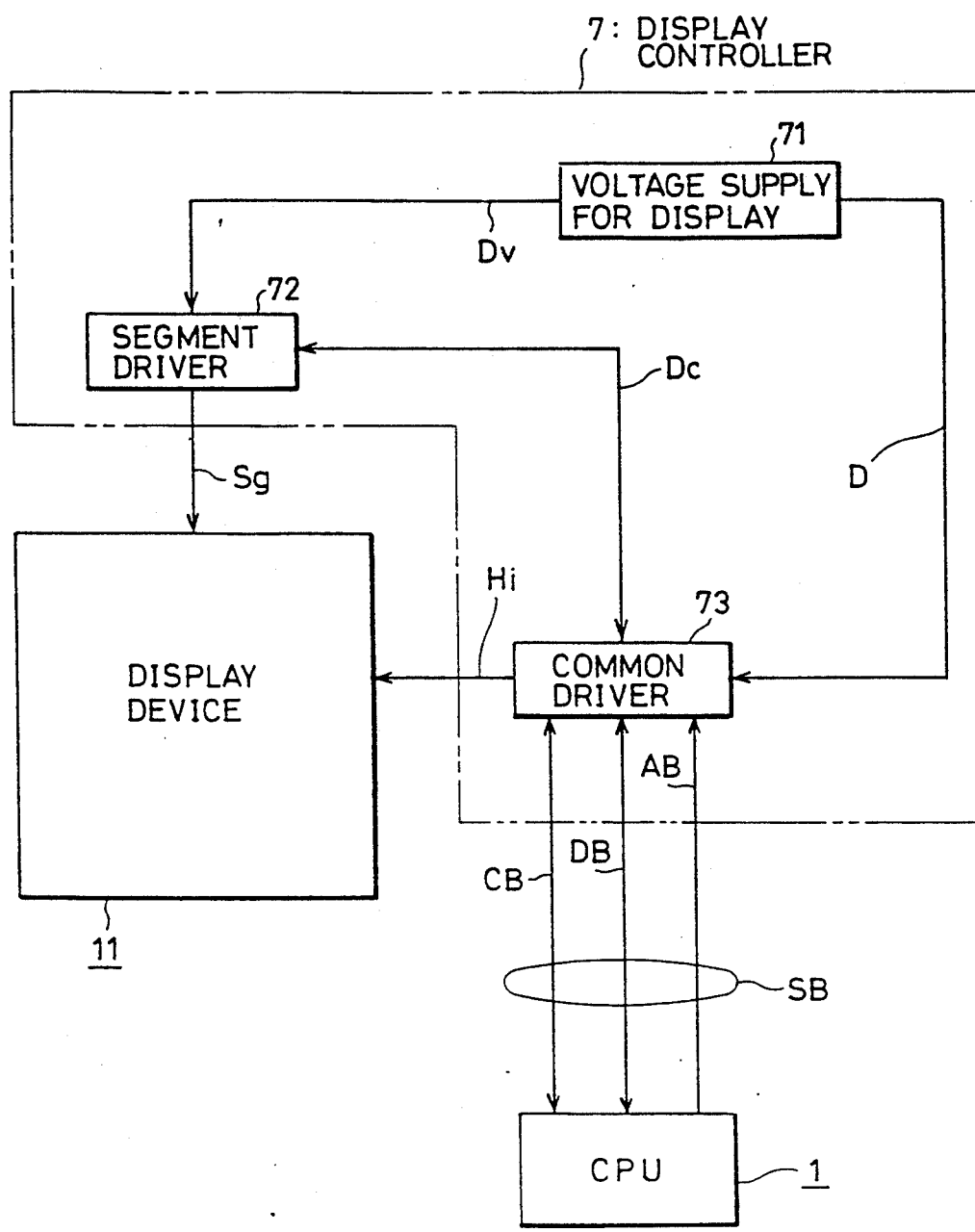
FIG. 2 is a block diagram schematically showing a display controller in the display integrated type tablet device according to an embodiment of the present invention.

FIG. 2 is a block diagram showing a structure of a display controller 7 of a display integrated type tablet apparatus according to an embodiment of the present invention. The display controller 7 of FIG. 2 is an improvement of the conventional display controller 12, and is provided to control and drive the display device 11 under the control of the CPU 1. The display controller 7 includes a voltage supply for display 71 for applying voltage Dv to the display device 11, and a segment driver 72 and a common driver 73 for supplying to the display device 11 a segment signal Sg and a common signal Hi ($i=0, 1, 2, \ldots$, max.), respectively, for driving the device 11. The common driver 73 is connected to the CPU 1 via a system bus SB formed of a control bus CB, a data bus DB, and an address bus AB. The common driver 73 and the segment driver 72 output a common signal Hi and a segment signal Sg, respectively, in synchronization with each other in accordance with a display control signal Dc. In operation, the common driver 73 provides a common signal Hi having a level of display voltage Dv in accordance with a clock signal. The segment driver 72 provides a segment signal Sg having a level of display voltage Dv in accordance with data stored in the RAM for display. The common signal Hi and the segment signal Sg are supplied to the display device 11 to drive the matrix of liquid crystal elements in units of rows and columns.

Figure 3:
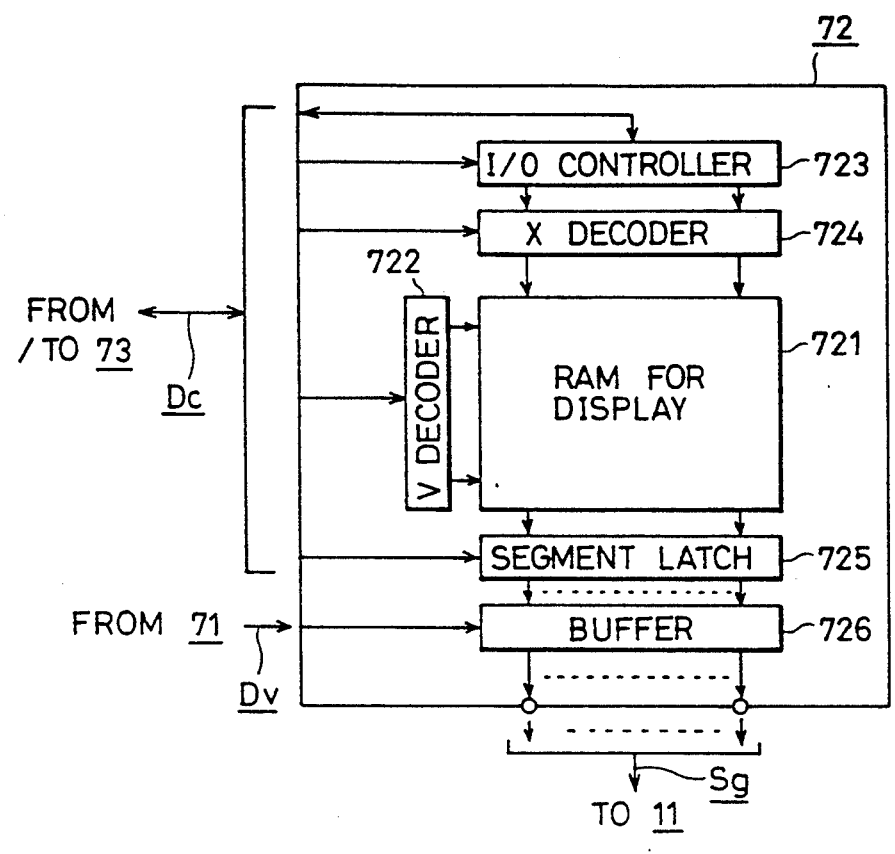
FIG. 3 is a block diagram schematically showing a segment driver shown in FIG. 2.

FIG. 3 is a block diagram showing a structure of the segment driver 72 of FIG. 2. Referring to FIG. 3, the segment driver 72 includes a RAM 721 for display formed of a matrix of memory cells corresponding to the matrix of the liquid crystal elements in the display device 11, a V decoder 722, an I/O controller 723 and a X decoder 724 provided for reading/writing data for display with respect to the RAM 721, and a segment latch 725 and a buffer 726 for providing the aforementioned segment signal Sg. In operation, data is written into the RAM 721 using an applied control signal Dc. Then, in accordance with the signal Dc, data is read out from the RAM 721 to be provided to the latch 725 and the buffer 726 to be converted into a segment signal Sg having the level raised to the level of voltage Dv, and then provided to the display device 11. The data stored in the RAM 721 is read out as desired in accordance with the signal Dc from the driver 73 side. The read out data is converted into a signal Dc via the I/O controller 723 to be transmitted to the driver 73 side.

Figure 4:
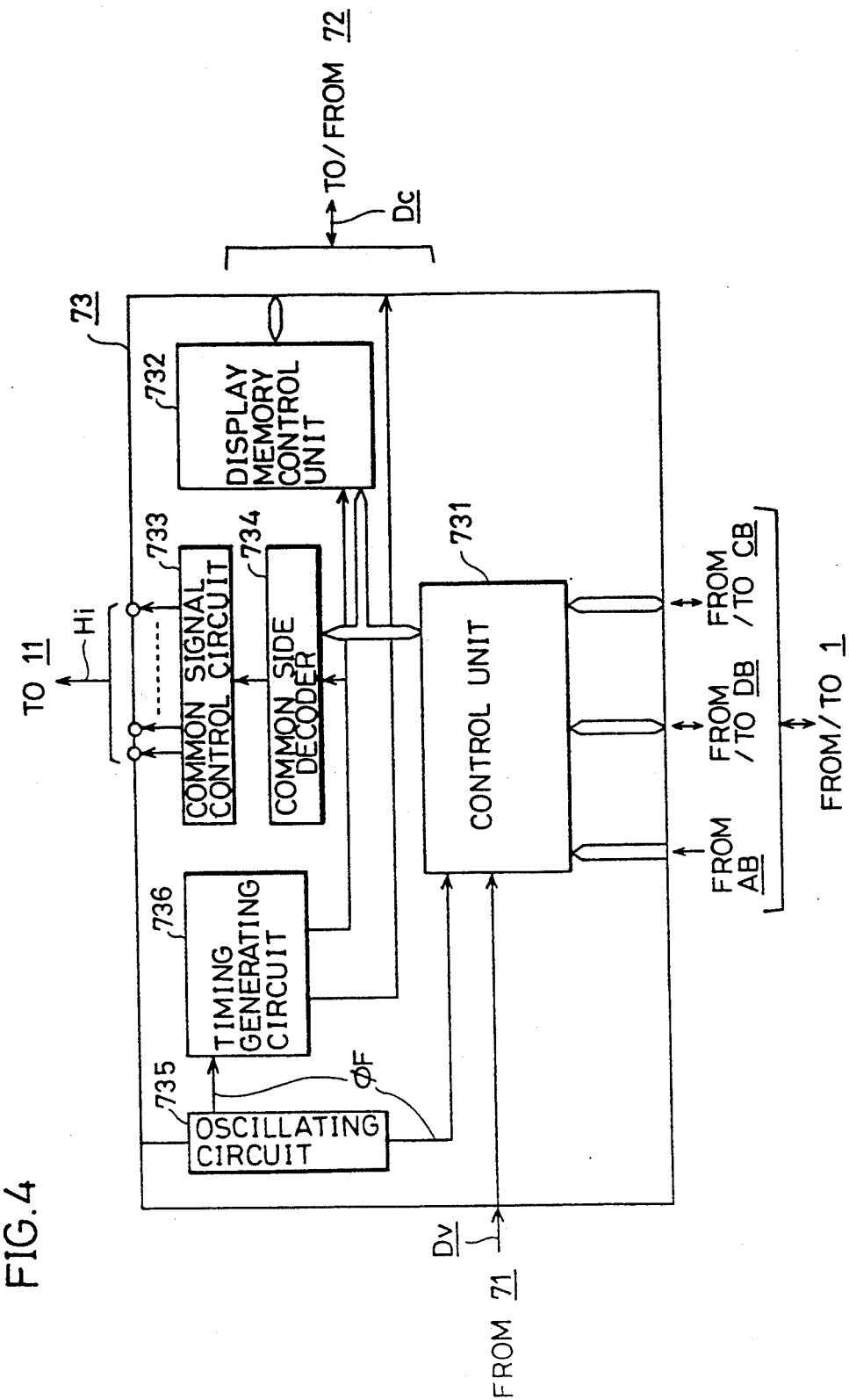
FIG. 4 is a block diagram schematically showing a common driver shown in FIG. 2.

FIG. 4 is a block diagram showing a structure of the common driver 73 of FIG. 2. Referring to FIG. 4, the common driver 73 includes a control unit 731 for the centralized control of the driver 73 itself, a display memory control unit 732 for storing data to be displayed, a common signal control circuit 733 and a common side decoder 734 for providing the aforementioned common signal Hi, an oscillating circuit 735 for oscillating a clock signal $\phi F$ in stabilization, and a timing generating circuit 736 for generating a predetermined signal for generating a common signal Hi and the like in accordance with the clock signal $\phi F$. In operation, the clock signal $\phi F$ output from the oscillating circuit 735 is provided in parallel to the timing generating circuit 736 and the control unit 731 In response to the signal $\phi F$, the circuit 736 generates a predetermined signal that is provided in parallel to the common side decoder 734 and the display memory control unit 732, and is provided to the segment driver 72 as the display control signal Dc. Because the control unit 731 provides the supplied signal $\phi F$ to the input port of the CPU 1 via the data bus DB, the CPU 1 can make determination whether the level of the clock signal $\phi F$ is "H" or "L" if necessary every time the signal level at the input port is read. Also, the control unit 731 generates data for reading/writing the contents of the display RAM 721 in accordance with the data provided from the CPU 1 via the data bus DB to supply the same to the display memory control unit 732. The display memory control unit 732 converts the applied data into a display control signal Dc to provide the same to the driver 72. The common side decoder 734 and the common signal control circuit 733 generate and provide to the display device 11 the common signal Hi raised to the voltage Dv applied via the control unit 731 in synchronization with a predetermined signal provided from the circuit 736.

As described in reference to the above FIGS. 2–4, the display controller 7 generates a segment signal Sg and a common signal Hi in accordance with the contents of the display RAM 721 where data to be displayed is written/read by the CPU 1 via the common driver 73.

Figure 5:
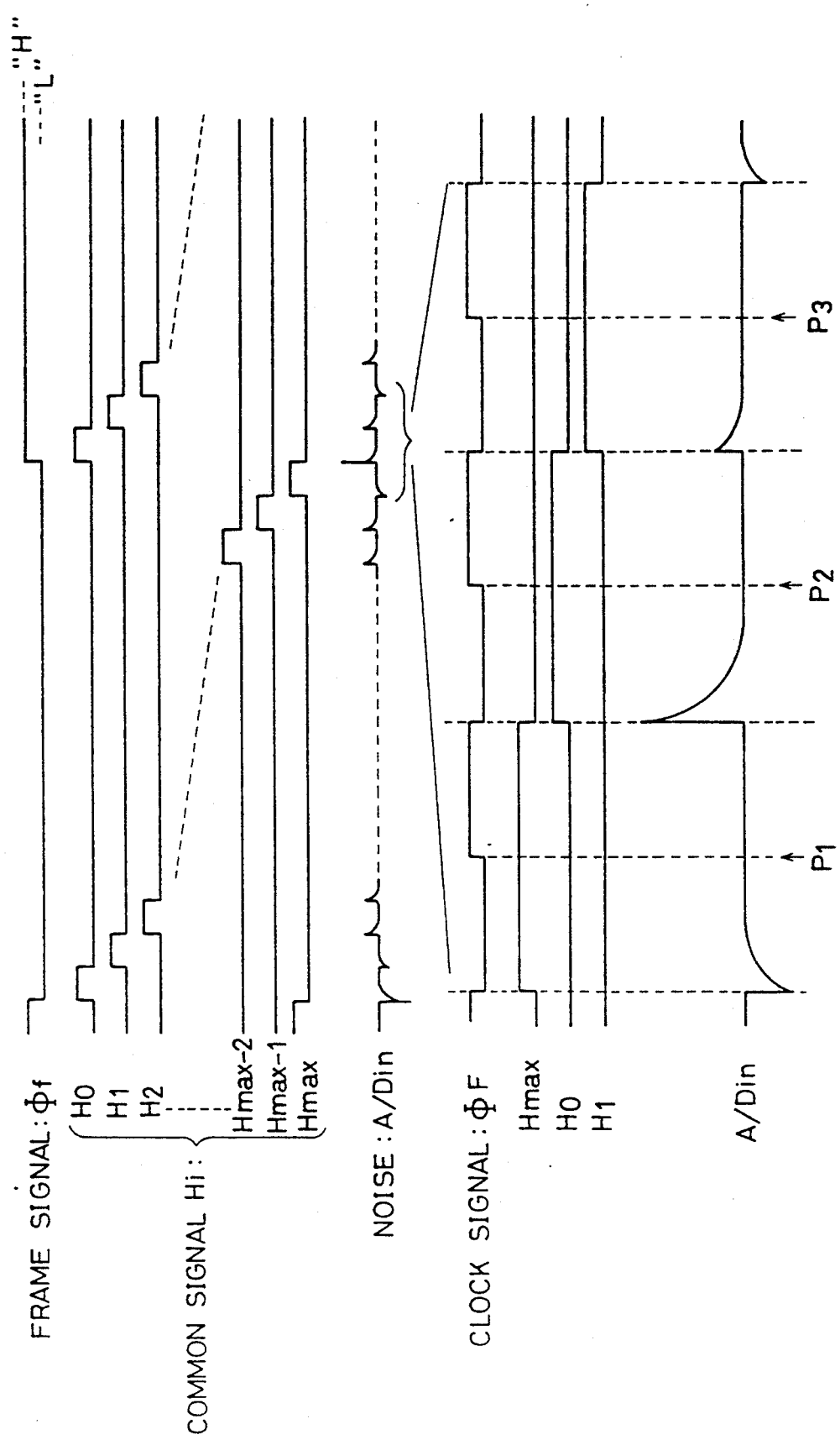
FIG. 5 is a diagram for describing the relationship of the display driving waveform and noise detected at the coordinate measurement terminals in the display integrated type tablet apparatus according to an embodiment of the present invention.

FIG. 5 is a diagram for describing the relationship between the waveform of a display driving signal and noise detected at coordinate measurement terminals in a display integrated type tablet device according to an embodiment of the present invention.

Figure 6:
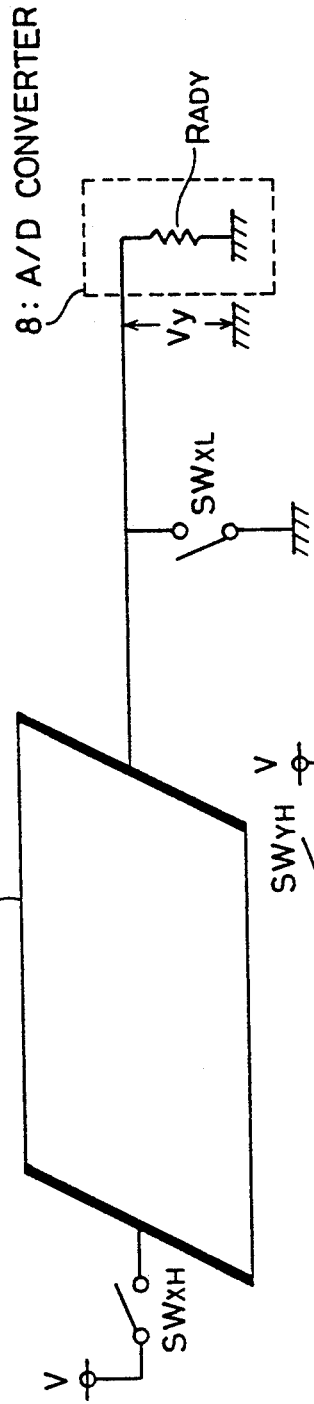
FIG. 6 is a diagram showing the principle of a driving circuit for reading out coordinates in a display integrated type tablet apparatus according to an embodiment of the present invention.
Figure 6:
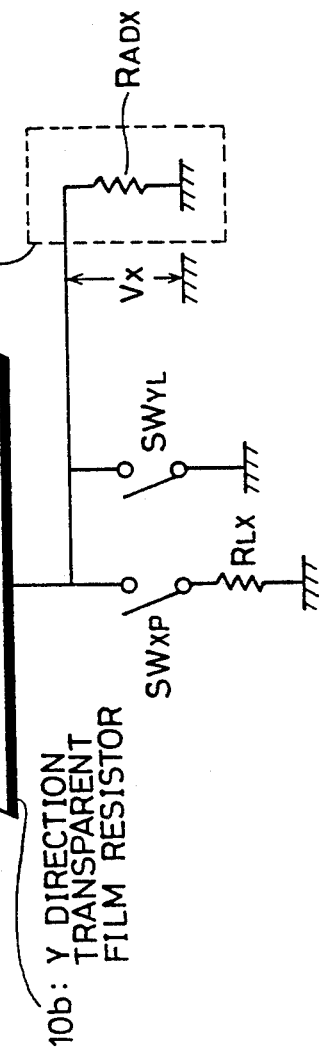

FIG. 6 is a diagram showing the principle of a driving circuit for coordinate read out in a display integrated type tablet apparatus according to an embodiment of the present invention.

Referring to FIG. 5, a frame signal $\phi f$, a common signal Hi, noise A/Din, and a clock signal $\phi F$ are shown. The common signal Hi is a signal output shifted by every predetermined timing for driving in sequence every line of a liquid crystal element matrix included in the display device 11. If there are (max+1) lines in the liquid crystal element matrix, the common signal Hi is $i=0, 1, 2, \ldots,$ max to sequentially drive each line. The frame signal $\phi f$ is shown in association with the common signal Hi. The frame signal $\phi f$ has its level changed to the H level (Logical High) from the L level (Logical Low), or to the L level from the H level every time all the lines in the liquid crystal element matrix are driven by a common signal Hi. More specifically, the maximum value i of the common signal H and the cycle of the frame signal $\phi f$ are determined depending on the size of the liquid crystal element matrix. As described before, the clock signal $\phi F$ is a signal for generating the common signal Hi. The noise A/Din is the noise detected in the input stage of the A/D converter 8 at the time of position read out of the tablet 10.

It can be appreciated from FIG. 5 that a particularly great noise A/Din is generated at the transition point of the signal level of the frame signal $\phi f$. There is also a generation of noise A/Din at the switching point of the common signal Hi. A significant noise A/Din is seen when the transition point of the frame signal $\phi f$ and the switching point of the common signal Hi coincide with each other. At the respective timing of generation of these noises A/Din, there is a change in the level of the driving voltage applied to the display device 11, which appears as a noise to a detecting signal in the tablet 10 that forms electrostatic capacitive coupling with the display device 11. As mentioned above, the noise increases in proportion to the size of the area of the main surface of the tablet 10. The noise A/Din is considerably great at the level transition point of the frame signal $\phi f$ because there is a great change in the level of the driving voltage applied to the display device 11. The major portion of noise A/Din is caused by a change in the level of the driving voltage applied to the display device 11. The generation timing of this noise is in synchronization with the frame signal $\phi f$ and the common signal Hi that is associated with the drive of the display device 11. Therefore, when the output voltage of the tablet 10 is measured for coordinate measurement, the present embodiment has the A/D converter 8 carry out the converting process in synchronization with the display driving signal of the display device 11, to measure the coordinates when noise is not mixed, to improve the reading accuracy of the coordinates. The reading out process of coordinates is carried out as follows.

The process for measuring coordinates is realized by executing periodically a program according to the procedure flow of FIG. 1A under the control of the CPU 1. The procedure for A/D conversion of FIG. 1B represents an important feature of the present invention. The sampling timing of the A/D converter 8 is carried out so as to be in synchronization with the timing of the drive of the display device 11 and the measurement of coordinates.

As shown in FIG. 5, the clock signal $\phi F$ has a cycle two times that of the common signal Hi for driving the display device 11. The noise A/Din from the display device 11 is generated at the fall of the clock signal $\phi F$ as shown in FIG. 5. Therefore, measurement of coordinates where the noise A/Din is not mixed can be obtained by initiating the conversion of the A/D converter 8, i.e. take the data sampling points P1, P2, P3, . . . of the A/D converter 8, at the rise of the signal $\phi F$.

The specific measurement procedure of coordinates will be described in detail with reference to FIGS. 5 and 6 according to the procedure flow shown in FIGS. 1A and 1B. The present embodiment is implemented so that the common signal Hi and the clock signal $\phi F$ are generated by the display controller 7 to be provided to the display device 11, and the CPU 1 reads out the clock signal $\phi F$ via the display controller 7. Under the control of the CPU 1, the tablet controller 9 supplies voltage for coordinate value measurement to the X direction transparent film resistor 10a and the Y direction transparent film resistor 10b forming the tablet 10 and carries out the open/close control of various switches which will be described later. The A/D converter 8 obtains from the CPU 1 the sampling timing of the voltage signal from the tablet 10. By an internal timer not shown, the CPU 1 periodically obtains the timing for coordinate measurement on the tablet 10.

The timing for conversion of the A/D converter 8 is described with reference to the procedure flow of FIG. 1B. The A/D converter 8 has its operation controlled under the control of the CPU 1. In operation, the CPU 1 has a clock signal $\phi F$ entered from the display controller 7. The rising timing of that signal level is obtained by the determination processes of step S10 (abbreviated as S10 in the drawing) and step S11. During the time period the rising timing of the clock signal $\phi F$ is not obtained, the process of step S10 or step S11 is executed repeatedly. When a rising timing of the clock signal $\phi F$ is detected, the process of step S12 is immediately executed, whereby the CPU 1 provides the start timing of A/D conversion with respect to the A/D converter 8. In response, the converter 8 carries out sampling of a voltage signal for coordinate measurement provided from the tablet 10 in any of the sampling points of P1, P2, and P3 as shown in FIG. 5. The sampled voltage signal is converted into a digital signal according to a predetermined procedure to be provided to the CPU 1. When the CPU 1 receives the digital signal from the converter 8 and confirms the termination of A/D conversion in the process of step S13, the program proceeds to the process of step S14 where a coordinate value is read out by writing the supplied digital signal into the RAM 3. Thus, the series of the A/D converting process ends. The converted result (the obtained coordinate values) may be displayed in real time on the display device 11 via the display controller 7.

In the procedure of FIG. 1A, the CPU 1 periodically carries out the procedure of coordinate measurement. It is assumed that the display device 11 is driven by the controller 7 for display.

In the process of step S1, a check is made whether an arbitrary point on the main surface of the tablet 10 is depressed by a user with the tip of a pen or a pencil. More specifically, the application of voltage to the X direction transparent film resistor 10a from the voltage supply V is initiated by the CPU 1 turning on switches $SW_{XH}$ and $SW_{XP}$ and turning off all the other switches shown in FIG. 6 via the tablet controller 9. After waiting for stabilization of the applied voltage, the X direction signal $V_x$ in FIG. 6 is converted into a digital signal by the above-described A/D converter 8 to be measured. If determination is made that the X direction signal $V_x$ exceeds a predetermined value in the process of step S2, determination is made that the main surface of the tablet 10 is depressed and the processes of steps S3 and et seq. are executed. If determination is made that the main surface of the tablet 10 is not depressed, the processes of steps S3 and et seq. are not carried out to end the procedure.

In the processes of steps S3 and et seq., coordinate measurement in the X direction and the Y direction of the depressed position is carried out. At step S3, the CPU 1 turns on switches $SW_{XH}$ and $SW_{XL}$ and turns off all the other switches via the controller 9. As a result, voltage for coordinate measurement is applied to the X direction transparent film resistor 10a. After waiting for the applied voltage to the film resistor 10a to stabilize, the A/D converter 8 is driven under the procedure of FIG. 1B in synchronization with the rise of the clock signal $\phi F$, as described above, whereby the X direction signal $V_X$ (X coordinate) is measured. This signal $V_X$ is converted into a digital signal to be provided to the CPU 1.

At step S5, the CPU 1 turns on switches $SW_{YH}$ and $SW_{YL}$ and turns off all the other switches via the controller 9. As a result, voltage for measuring Y direction coordinate is applied to the Y direction transparent film resistor 10b. After waiting for the voltage applied to the film resistor 10b to stabilize, the A/D converter 8 is driven under the procedure of FIG. 1B in synchronization with the rise of the clock signal $\phi F$ to measure a Y direction signal $V_Y$ (Y coordinate) in step S6. The obtained Y direction signal $V_Y$ is converted into a digital signal to be provided to the CPU 1.

Upon measurement of a X direction signal $V_X$ and a Y direction signal $V_Y$, the CPU 1 turns off switches $SW_{YH}$ and $SW_{YL}$ which were on via the tablet controller 9, whereby all the voltage applied to the tablet 10 is released to terminate the series of coordinate measurement procedure.

According to the above described coordinate measurement procedure, the A/D converter carries out voltage signal collection for coordinate measurement of the tablet 10 at a sampling timing that avoids noise A/Din from the display device 11 in synchronization with a clock signal $\phi F$ for driving the display device 11, so that noise A/Din is not included in the collected signal for coordinate measurement to carry out coordinate measurement operation of high accuracy.

The display device 11 is not limited to a display formed of liquid crystal elements, and the present invention is applicable to any that is driven in synchronization with a predetermined clock signal such as a display of electroluminance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display integrated type position reading apparatus comprising:
    a display unit driven for display in accordance with a driving signal in synchronization with a predetermined clock signal;
    a transparent conductive sheet member mounted on a display screen of said display unit;
    depression detecting means for detecting that an arbitrary position on a main surface of said sheet member opposite to said display screen is depressed; and
    position reading means, responsive to detection by said depression detecting means, for reading out an electric signal indicative of the depressed position with a cycle in synchronization with said predetermined clock signal,
    wherein said cycle is set so that position reading is carried out at a timing which avoids mixing of noise components, caused by a transition in the level of said driving signal, into said electric signal.

2. The display integrated type position reading apparatus according to claim 1, wherein said depression detecting means comprises:

first voltage applying means for applying voltage to said sheet member to detect depression of an arbitrary position on said sheet member;

first voltage detecting means for detecting an output voltage level of said sheet member after voltage is applied by said first voltage applying means; and determination means for determining whether an arbitrary position on said main surface of said sheet member is depressed in accordance with said output voltage detected by said first voltage detecting means.

3. The display integrated type position reading apparatus according to claim 2, wherein said position reading means comprises:

second voltage applying means for applying voltage to said sheet member to detect a depressed position on said sheet member;

second voltage detecting means for detecting an output voltage level of said sheet member after voltage is applied by said second voltage applying means;

oscillator means for generating said predetermined clock signal;

enabling means, responsive to said cycle which is in synchronization with said predetermined clock signal generated by said oscillating means, for enabling said second voltage detecting means; and depressed position identifying means for identifying said depressed position in accordance with said output voltage level detected by said second voltage detecting means.

4. The display integrated type position reading apparatus according to claim 2, wherein said depressed position includes a first position related to an abscissa and a second position related to an ordinate on said main surface, said position reading means comprising:

horizontal direction voltage applying means for applying voltage to said sheet member to detect said first position on said sheet member related to the abscissa;

vertical direction voltage applying means for applying voltage to said sheet member to detect said second position on said sheet member related to the ordinate;

oscillating means for generating said predetermined clock signal;

horizontal direction voltage detecting means, responsive to said cycle which is in synchronization with said predetermined clock signal, for detecting an output voltage level of said sheet member after voltage is applied by said horizontal direction voltage applying means;

vertical direction voltage detecting means, responsive to said cycle which is in synchronization with said predetermined clock signal, for detecting an output voltage level of said sheet member after voltage is applied by said vertical direction voltage applying means; and coordinate position identifying means for identifying said depressed position based on said first position related to the abscissa and said second position related to the ordinate, in accordance with output voltage levels detected by said horizontal and vertical direction voltage detecting means.

5. The display integrated type position reading apparatus according to claim 1, wherein said position reading means comprises:

first voltage applying means for applying voltage to said sheet member to detect a depressed position on said sheet member;

first voltage detecting means for detecting an output voltage level of said sheet member after voltage is applied by said first voltage applying means;

oscillating means for generating said predetermined clock signal;

enabling means, responsive to said cycle which is in synchronization with said predetermined clock signal generated by said oscillating means, for enabling said first voltage detecting means; and depressed position identifying means for identifying said depressed position in accordance with said output voltage level detected by said first voltage detecting means.

6. The display integrated type position reading apparatus according to claim 1, wherein said depressed position includes a first position related to an abscissa and a second position related to an ordinate on said main surface, said position reading means comprising:

horizontal direction voltage applying means for applying voltage to said sheet member to detect said first position on said sheet member related to the abscissa;

vertical direction voltage applying means for applying voltage to said sheet member to detect said second position on said sheet member related to the ordinate;

oscillating means for generating said predetermined clock signal;

horizontal direction voltage detecting means, responsive to said cycle which is in synchronization with said predetermined clock signal, for detecting an output voltage level of said sheet member after voltage is applied by said horizontal direction voltage applying means;

vertical direction voltage detecting means, responsive to said cycle which is in synchronization with said clock signal, for detecting an output voltage level of said sheet member after voltage is applied by said vertical direction voltage applying means; and coordinate position identifying means for identifying said depressed position based on said first position related to the abscissa and said second position related to the ordinate, in accordance with output voltage levels detected by said horizontal and vertical direction voltage detecting means.

7. A display integrated type position reading apparatus comprising:

a display unit driven for display in accordance with a driving signal in synchronization with a predetermined clock signal;

a transparent conductive sheet member mounted on a display screen of said display unit;

depression detecting means for detecting that an arbitrary position on a main surface of said sheet member opposite to said display screen is depressed;

position reading means, responsive to detection by said depression detecting means, for reading out an electric signal indicative of the depressed position with a cycle in synchronization with said predetermined clock signal; and display means for displaying an image on said display screen according to said depressed position read out by said position reading means, wherein said cycle is set so that position reading is carried out at a timing which avoids mixing of noise components, caused by a transition in the level of said driving signal, into said electric signal.

8. An integrated type display position reading apparatus comprising:

display means for displaying images in accordance with driving signals applied in synchronization with a predetermined clock signal, said display means including a display screen with first and second transparent conductive sheets mounted thereon which are depressible;

depression detecting means for detecting depression of said first and second transparent conductive sheets; and position reading means, responsive to detection of a depression of said first and second transparent conductive sheets, for determining a position of the detected depression in accordance with detected voltage output levels of said first and second transparent conductive sheets, said position determining means determining the position of the detected depression in synchronization with the predetermined clock signal to avoid mixing of noise into the detected voltage output levels due to transitions in the level of the driving signals.

9. The integrated type display position reading apparatus of claim 8, wherein said first and second transparent conductive sheets respectively comprise first and second transparent thin film resistors.

10. The integrated type display position reading apparatus of claim 9, wherein said depression detecting means comprises:

first voltage applying means for applying a first voltage to said first transparent thin film resistor;

first voltage detecting means for detecting a first voltage output level of said first transparent thin film resistor after application of the first voltage; and determination means for determining whether said first and second transparent thin film resistors are depressed in accordance with the detected first voltage output level.

11. The integrated type display position reading apparatus of claim 10, wherein said position reading means includes said first voltage applying means and said first voltage detecting means and further comprises:

second voltage applying means for applying a second voltage to said second transparent thin film resistor;

second voltage detecting means for detecting a second voltage output level of said second transparent thin film resistor after application of the second voltage;

oscillating means for generating the predetermined clock signal;

enabling means, coupled to said oscillating means, for enabling said first and second voltage detecting means in synchronization with the predetermined clock signal; and depressed position identifying means for identifying the depressed position of said first and second transparent thin film resistors in accordance with the first and second voltage output levels.

12. The integrated type display position reading apparatus of claim 8, wherein said first and second transparent conductive sheets are conductive in respective first and second directions, the first and second directions corresponding respectively to an abscissa and ordinate of said display screen.

13. The integrated type display position reading apparatus of claim 8, wherein the driving signals comprise plural line driving signals, each driving a respective line of said display screen and each having a predetermined pulse width which is shifted in phase by a predetermined amount with respect to a line driving signal of an adjacent line.

14. A method of determining a depressed position on an integrated type display position reading apparatus which includes display means having a display screen with first and second transparent conductive sheets mounted thereon which are depressible, the display means being driven by a driving signal applied in synchronization with a predetermined clock signal, the method comprising the steps of:

a) applying a first voltage to the first transparent conductive sheet;

b) detecting a voltage output level of the first transparent conductive sheet subsequent application of the first voltage;

c) applying a second voltage to the second transparent conductive sheet;

d) detecting a voltage output level of the second transparent conductive sheet subsequent application of the second voltage; and e) determining the depressed position of the first and second transparent conductive sheets in accordance with the voltage output levels detected in said steps b) and d), said steps b) and d) of detecting occurring in synchronization with the predetermined clock signal to avoid mixing of noise into the detected voltage output levels due to transitions in the level of the driving signal.

* * * * *